Figure 6:
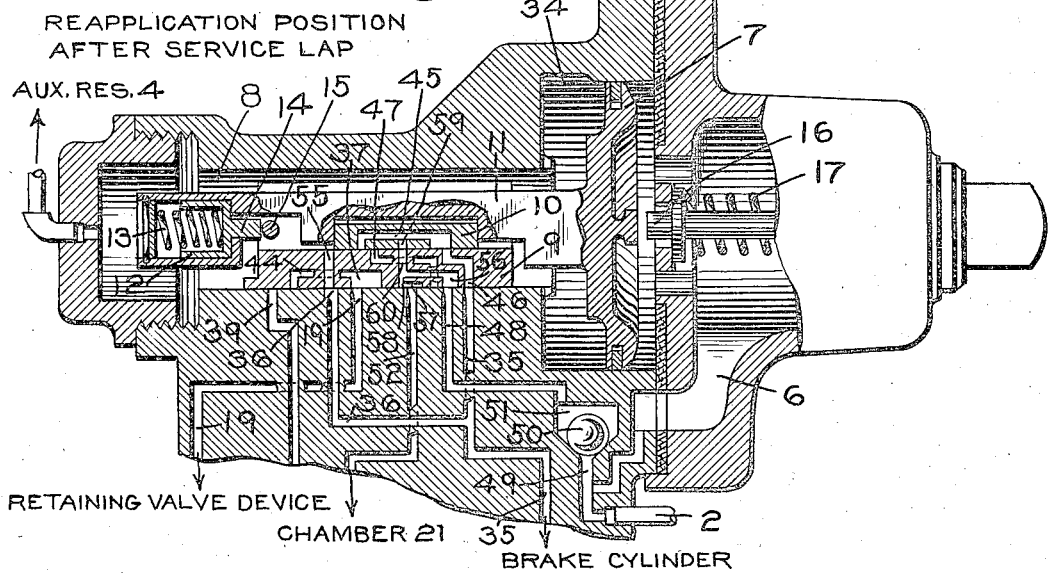

March 17, 1936.  C. C. FARMER  2,034,287
QUICK SERVICE VALVE DEVICE
Filed Sept. 29, 1930  3 Sheets-Sheet 1
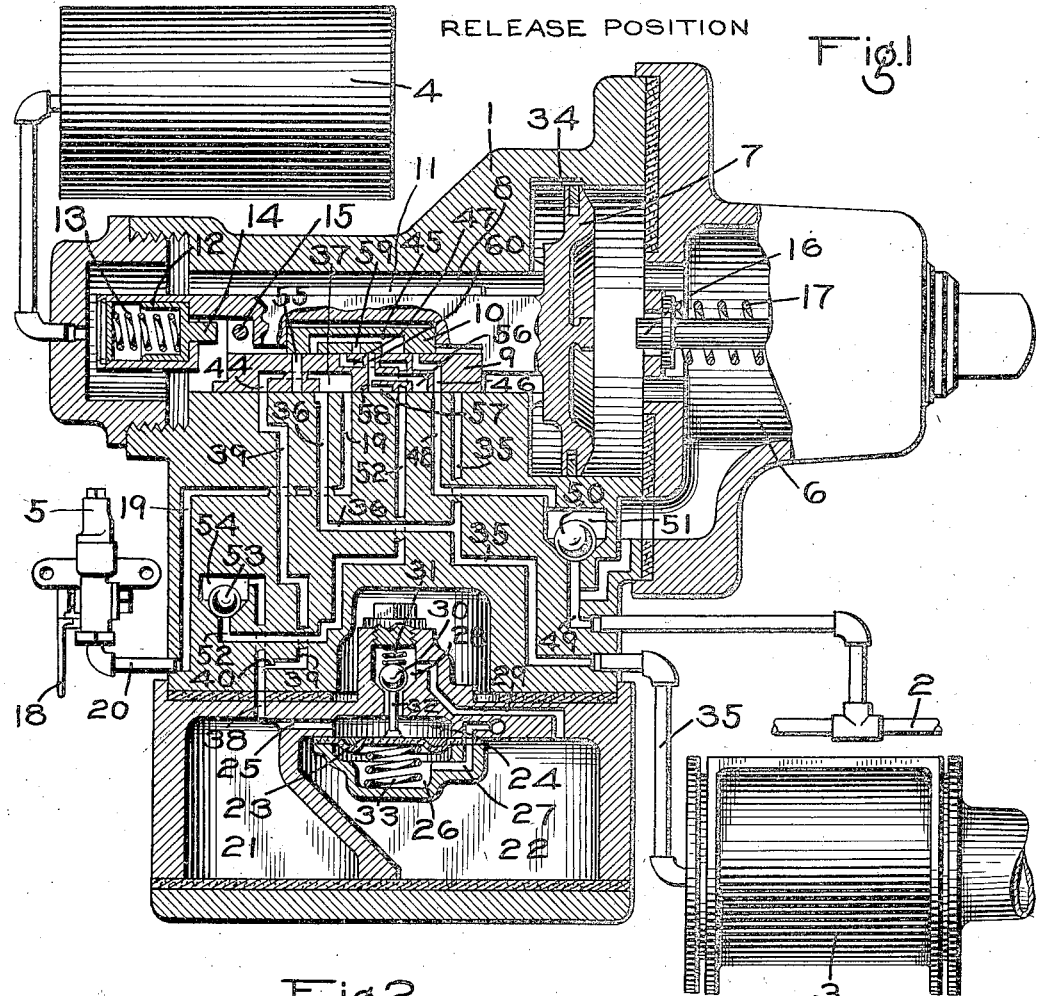
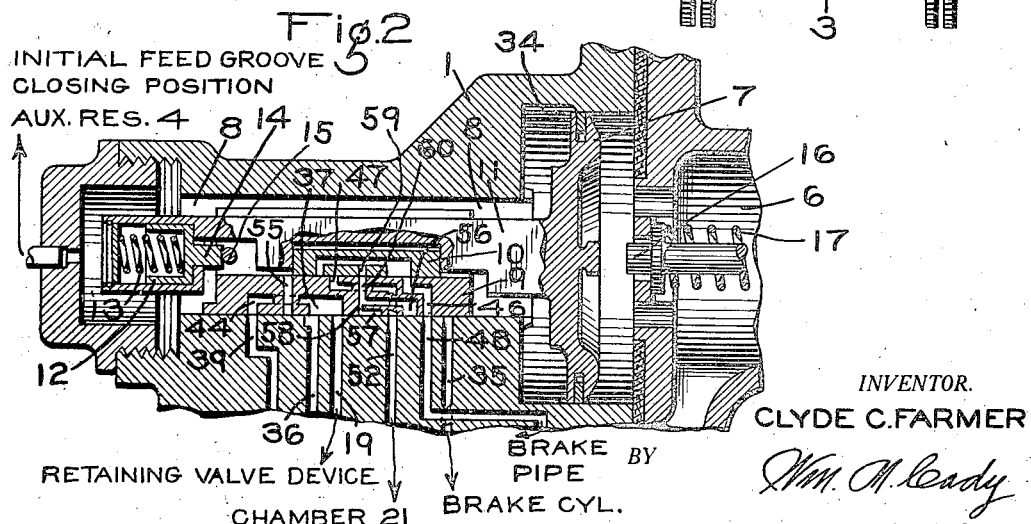
INVENTOR.
CLYDE C. FARMER
BY Wm. H. Cady
ATTORNEY.

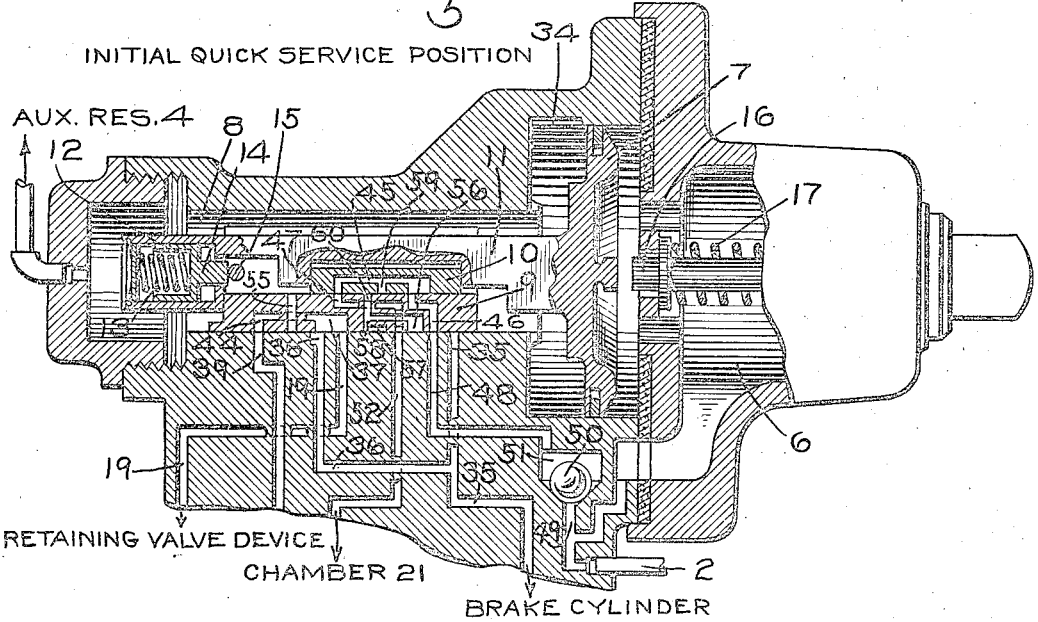
Fig.3 INITIAL QUICK SERVICE POSITION
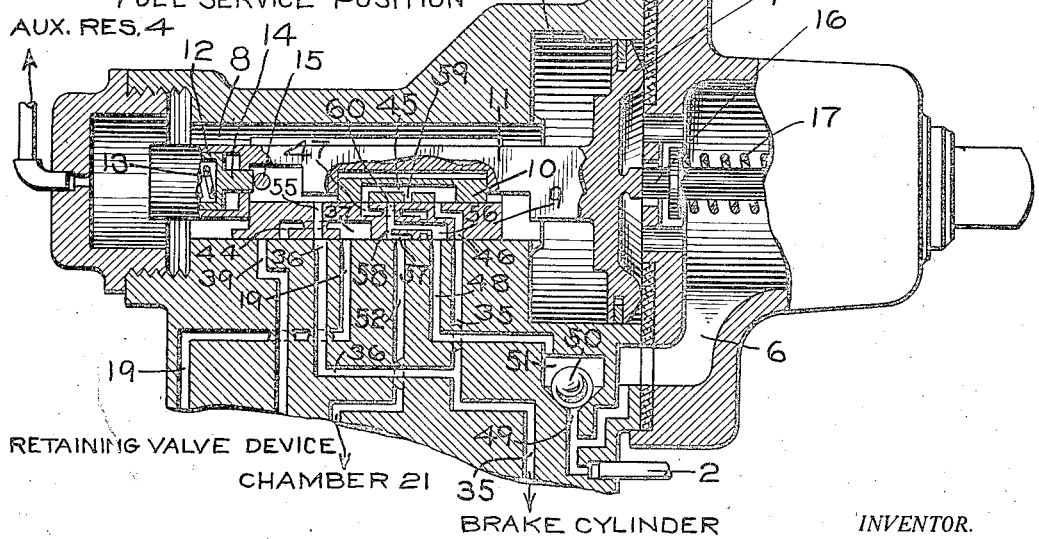
Fig.4 FULL SERVICE POSITION
INVENTOR.
CLYDE C. FARMER
BY
ATTORNEY.

March 17, 1936.  C. C. FARMER  2,034,287
QUICK SERVICE VALVE DEVICE
Filed Sept. 29, 1930  3 Sheets-Sheet 3

INVENTOR.
CLYDE C. FARMER
BY
Wm. M. Cady
ATTORNEY.

Patented Mar. 17, 1936

2,034,287

UNITED STATES PATENT OFFICE 2,034,287

QUICK SERVICE VALVE DEVICE

Clyde C. Farmer, Pittsburgh, Pa., assignor to The Westinghouse Air Brake Company, Wilmerding, Pa., a corporation of Pennsylvania Application September 29, 1930, Serial No. 484,979

46 Claims. (Cl. 303—39)

This invention relates to the well known automatic fluid pressure brake system in which the brakes are applied by effecting a reduction in brake pipe pressure and are released by effecting an increase in brake pipe pressure and more particularly to the fluid pressure brake system shown and described in my pending application for United States Letters Patent, filed August 6, 1930, for Triple valve device and serially numbered 473,323.

With the increase in train lengths, as mentioned in my above mentioned application, the difficulty of applying and releasing the brakes without causing excessive shocks has correspondingly increased, due to the running in of the slack before the brakes are applied on the rear cars of the train, and the running out of the slack before the brakes are released on the rear cars.

In actual service, difficulty is encountered in causing all brakes to promptly apply on long trains, because of the slow rate of brake pipe reduction. This slow rate of brake pipe reduction is due to a number of well known reasons, some of which are specifically mentioned in my above mentioned pending application.

The principal object of my invention is to provide an improved brake equipment by which the brakes can be applied with certainty and without causing excessive shocks.

According to one feature of my present invention, the initial venting of fluid under pressure from the brake pipe to two normally vented chambers to effect a quick serial action (commonly known as quick service) in a service application, is effected by the triple valve device or similar brake controlling valve device, in advance of the movement of the main slide valve to service application position, and upon a light but predetermined and definite reduction in brake pipe pressure, such as a one pound reduction in brake pipe pressure.

According to my improvement, the triple valve piston first moves to close the feed groove and in so doing moves the graduating valve relative to the main slide valve, the movement of the piston being resisted only by the normal friction of the piston and graduating valve, and then after a further movement of the graduating valve by the triple valve piston, upon a predetermined reduction in brake pipe pressure, a local venting of fluid from the brake pipe to two chambers is effected, without moving the main slide valve, thus causing similar quick serial service operation of all of the triple valve devices throughout the train, each in advance of the application of the brakes on that car.

As a result, a limited and sharp brake pipe reduction is rapidly transmitted throughout the train, which causes the triple valve pistons to first positively close the feed grooves before any appreciable back flow of fluid under pressure from the auxiliary reservoir to the brake pipe can occur, and then the triple valve pistons move to service application position, thus initiating an application of the brakes.

When the triple valve piston and slide valves are in service application position, a further local venting of fluid under pressure from the brake pipe to the two chambers is effected which is sufficient to insure the triple valve piston, and consequently the slide valves, remaining in a position to supply fluid under pressure to the brake cylinder, so that an effective brake cylinder pressure will be developed. The rate at which this quick service reduction is effected is relatively slow, so as to prevent surges in the fluid under pressure in the brake pipe which might be caused if a fast flow of fluid were permitted and further to dampen any surges of fluid in the brake pipe which may be caused upon effecting the initial local reduction in brake pipe pressure.

In addition to the above quick service action, means are included for venting fluid under pressure from the brake pipe to the brake cylinder to effect quick service action upon successive reductions in brake pipe pressure. This secondary quick service action or reduction in brake pipe pressure is governed by the pressure of fluid in the brake cylinder.

Another object of my invention is to prevent the excessive build up of brake cylinder pressure when the brakes are applied in cycling on descending grades, when the pressure retaining valve is cut in to retain pressure in the brake cylinder. In effecting the initial application of the brakes, fluid under pressure is locally vented from the brake pipe to two chambers to effect quick serial action. According to my invention, means are provided which are subject to the pressure retained in one of the chambers by the retaining valve device for preventing back flow of fluid under pressure from the other chamber when the triple valve device is returned to release position and the first mentioned chamber is connected to the retaining valve device, so as to reduce the extent of the quick service venting of fluid from the brake pipe as compared with an initial quick service reduction made when the brakes are completely released.

Other objects and advantages will appear in the following more detailed description of the invention.

Figure 5:
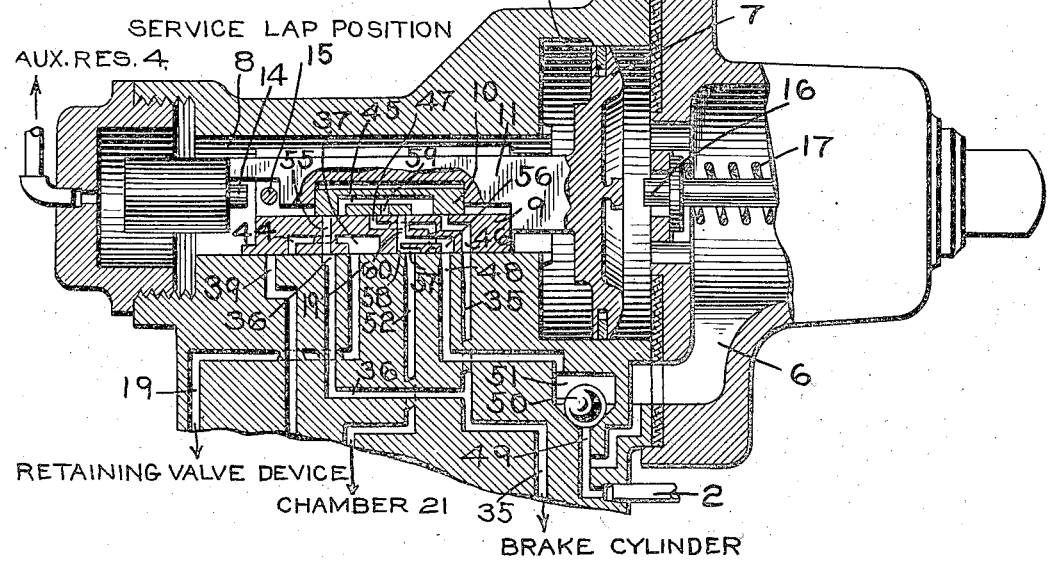

In the accompanying drawings; Figure 1 is a diagrammatic view, mainly in section, of a fluid pressure brake equipment embodying my invention and showing the triple valve device in release position; Fig. 2 is a fragmentary sectional view of the triple valve device, showing the parts as positioned upon initial movement of the triple valve piston to effect the closure of the feed groove; Fig. 3 is a fragmentary sectional view of the triple valve device, showing the parts thereof in initial quick service position; Fig. 4 is a fragmentary sectional view of the triple valve device, showing the parts thereof in service application position; Fig. 5 is a fragmentary sectional view of the triple valve device, showing the parts thereof in service lap position; and Fig. 6 is a fragmentary sectional view of the triple valve device, showing the parts thereof in reapplication position after service lap.

As shown in Fig. 1 of the drawings, the fluid pressure brake equipment may comprise a triple valve device 1, a brake pipe 2, a brake cylinder 3, an auxiliary reservoir 4, and a brake cylinder pressure retaining valve device 5.

The triple valve device 1 comprises a casing having a piston chamber 6, connected to the brake pipe 2, and containing a piston 7, and having a valve chamber 8 connected to the auxiliary reservoir 4 and containing a main slide valve 9, and a graduating slide valve 10, mounted on and having a movement relative to the main slide valve, said valves being operated by said piston through the medium of a piston stem 11.

Carried by said stem at its rear end is a movable member 12, subject to the pressure of a coil spring 13. This member is provided with a projection 14 which, upon forward movement of the stem 11, engages a pin 15 secured to the rear end of the main slide valve 9.

The piston 7, upon its movement to full service position, engages a movable stop 16, subject to the pressure of a coil spring 17.

The brake cylinder pressure retaining valve device 5 may be of the well known type having a controlling handle 18 which may be set in one position, so that the brake cylinder exhaust from the triple valve device through passage 19 and pipe 20 is connected to the atmosphere, and which may be set to another position, in which a predetermined degree of pressure is retained in the brake cylinder.

In the triple valve casing, chambers 21 and 22 are provided into which, under certain conditions, fluid under pressure is vented from the brake pipe.

Shown diagrammatically as being mounted in the triple valve casing is a valve device which comprises a flexible diaphragm 23 having the chamber 24 at one side thereof connected, through a passage 25, with the chamber 21, and the chamber 26 at the opposite side of the diaphragm connected to the atmosphere through a passage 27.

Contained in a chamber 28 in the valve device, which chamber is connected with the chamber 22 through a passage 29, is a valve in the form of a ball 30 which is subject to the pressure of a light coil spring 31, the pressure of which tends to urge the valve 30 to its seat. If desired, this spring may be omitted and the force of gravity relied upon to cause the valve to seat.

Interposed between and engaging the upper side of the diaphragm 23 and the under side of the valve 30 is a stem 32. Contained in the diaphragm chamber 26 and interposed between and engaging the casing and the under side of the diaphragm is a spring 33 which acts on the diaphragm and through the stem 32 in a direction urging the valve 30 from its seat.

When the valve 30 is unseated, communication is established from chamber 22 to chamber 21, through passage 29, valve chamber 28, diaphragm chamber 24 and passage 25.

In the release position of the triple valve parts, as shown in Fig. 1 of the drawings, a feed groove 34, around the triple valve piston 7 permits the supply of fluid under pressure from the piston chamber 6 and the brake pipe 2 to the valve chamber 8 and the auxiliary reservoir 4, so that the auxiliary reservoir is charged with fluid under pressure in the usual manner, when the brake pipe is charged through the operation of the usual engineer's brake valve device on the locomotive (not shown).

In this position, the brake cylinder is connected to passage 19 through a pipe and passage 35, a branch passage 36, and a cavity 37 in the main slide valve 9, so that the brake cylinder is open either directly to the atmosphere, or pressure is retained in the brake cylinder by the operation of the retaining valve device 5, according to the position of the handle 18.

Further, in this position, chamber 21 is connected to passage 19 and also to the brake cylinder through a passage 38, a branch passage 39 having a restricted portion 40, and through a port 44 in the main slide valve 9, which port opens into the cavity 37 in this slide valve, so that, in release position, chamber 21 is maintained at atmospheric pressure.

Since the valve 30 is normally held open by the pressure of the spring 33 acting through the medium of the diphragm 23 and stem 32 communication is open from the chamber 22 to the chamber 21, by way of passage 29, valve chamber 28, diaphragm chamber 24 and passage 25, so that chamber 22, when the brakes are completely released, is also at atmospheric pressure.

Upon a reduction in brake pipe pressure to effect an application of the brakes, the piston 7 moves at a slight differential in pressure between the auxiliary reservoir and the brake pipe, (less than one pound), so as to close the feed groove 34 and prevent back flow of fluid under pressure from the auxiliary reservoir to the brake pipe.

The piston 7, as it thus moves, shifts the graduating slide valve 10 relatively to the main slide valve 9 until the projection 14 engages the pin 15 as shown in Fig. 2. Further movement of the piston, toward the right hand, is then resisted by the pressure of the spring 13, but when the brake pipe pressure is reduced a predetermined but light amount, for example, a reduction of one pound, the spring 13 is such that its resistance is overcome, permitting the piston to shift the graduating slide valve 10 to the initial quick service position, as shown in Fig. 3, without shifting the main slide valve 9.

In this position, a cavity 45 in the graduating slide valve 10 connects a port 46 in the main slide valve with a port 47 also in the main slide valve.

With the main slide valve 9 in release position, the port 46 registers with a passage 48 to which the brake pipe 2 is connected through a passage 49 past a ball check valve 50 and through a chamber 51 containing the ball check valve 50. The port 47 registers with a passage 52 which connects with the chamber 21 past a ball check valve 53, through a chamber 54 containing the check valve 53 and passage 38.

With the brake pipe 2 thus connected to the chamber 21, fluid under pressure is vented from the brake pipe to this chamber and fluid under pressure flows from this chamber through passage 25 to the diaphragm chamber 24 causing the diaphragm to be deflected downwardly against the pressure of the spring 33. From this chamber, fluid under pressure flows past the ball valve 30 and through valve chamber 28 and passage 29 to the chamber 22, the pressure of fluid raising the ball valve from its seat against the pressure of the spring 31. By thus venting fluid under pressure from the brake pipe to the chambers 21 and 22, a sharp and definite local reduction in brake pipe pressure is produced. This local reduction is rapidly transmitted to the next car of the train, causing the triple valve device on said next car to act in a similar manner, and so on throughout the length of the train. As a consequence, quick serial service action takes place on each car in advance of the application of the brakes on that car.

Following the above described quick service venting of fluid from the brake pipe, the triple valve piston 7 and main slide valve 9 are positively moved to service application position on each car, in which position, as shown in Fig. 4, a port 55 in the main slide valve, which port has been uncovered by the graduating slide valve in its initial movement toward service application position, registers with the passage 36 which is open to the passage 35 leading to the brake cylinder, so that fluid under pressure is supplied from the auxiliary reservoir 4 to the brake cylinder 3 to effect a service application of the brakes in the usual manner.

It will be noted that, with the main slide valve 9 in release position and the graduating slide valve 10 in quick service position as shown in Fig. 3, the passage 39 which leads from the chamber 21 is connected, through the port 44 and cavity 37 in the main slide valve, with the passages 19 and 36 leading to the retaining valve device 5 and brake cylinder 3 respectively. Due to the restricted portion 40 of the passage 39 and to the fact that the slide valve 9 is quickly moved to service position in which the above connections are lapped, no appreciable reduction in brake pipe pressure is effected through this connection.

The movement of the main slide valve 9 toward service position operates to cut off communication between the passages 48 and 52 by way of ports 46 and 47 in the main slide valve 9 and connecting cavity 45 in the graduating slide valve 10, and further operates to establish communication between these passages 48 and 52 through cavities 56 and 57 and a connecting choke port 58 all of which are in the main slide valve 9, the cavity 56 registering with the passage 48 and the cavity 57 registering with the passage 52, so that fluid under pressure is now vented from the brake pipe to, and may equalize in, chambers 21 and 22.

The total reduction in brake pipe pressure resulting from the quick service action, hereinbefore described, is sufficient to produce a desired and effective brake cylinder pressure, such as, for example, a brake cylinder pressure of 7 to 8 pounds.

When the auxiliary reservoir pressure has been reduced by flow to the brake cylinder to a degree slightly less than the reduced brake pipe pressure, the piston 7 shifts the graduating slide valve 10 back to service lap position, as shown in Fig. 5, in which position, the supply of fluid to the brake cylinder is cut off.

Upon a further reduction in brake pipe pressure to increase the brake cylinder pressure, the piston 7 moves from lap toward full service position to the position shown in Fig. 6, shifting the graduating slide valve 10 relatively to the main slide valve 9 which slide valve 9 is in service position. As the slide valve 10 is thus shifted it uncovers port 55 in the main slide valve and since this port registers with the passage 36, fluid under pressure is now supplied from the auxiliary reservoir to the brake cylinder. Further, with the slide valve 10 in the position shown in Fig. 6, a port 59 therein, which is open to the cavity 45, registers with a port 60 in the main slide valve, which port 60 is open to the cavity 56, and the cavity 45 registers with the port 46 in the main slide valve, so that fluid under pressure is vented from the brake pipe to the brake cylinder to produce a local reduction in brake pipe pressure which is rapidly transmitted to the next car of the train, causing the triple valve device on said next car to act in a similar manner, and so on throughout the length of the train.

When the several parts of the triple valve device are in the positions as shown in Fig. 6, the reduction in auxiliary reservoir pressure, due to the flow of fluid from this reservoir to the brake cylinder may be such that the triple valve piston, in its traverse toward full service position, will not be moved to full service position, but will be brought to a stop in the position shown. When this is the case, the connection from the brake pipe to the brake cylinder is maintained. If, when the triple valve parts are in these positions, and the brake pipe pressure is reduced below brake cylinder pressure, by leakage of fluid from the brake pipe or by an over reduction in brake pipe pressure and the triple valve parts do not move promptly to full service position, the check valve 50 will prevent back flow of fluid from the brake cylinder to the brake pipe.

The choke port 58 in the main slide valve 9 is of such a diameter that the flow of fluid therethrough from the brake pipe to the chambers 21 and 22 when the triple valve parts are in full service or service lap position, that surges in the fluid under pressure in the brake pipe will not be set up. Further, since in these positions, fluid under pressure is permitted to flow from the brake pipe to these chambers, any surges which may have been set up in the fluid in the brake pipe during the initial venting of fluid from the brake pipe to the chambers, will be dampened or entirely eliminated and as a consequence prevent the unintentional operation of the triple valve parts toward release position.

Upon increasing the brake pipe pressure to effect the release of the brakes, the triple valve piston 7 is operated to shift the graduating slide valve 10 and main slide valve 9 back to release position, as shown in Fig. 1. In this position, if a full release of the brakes is desired, the retaining valve handle 18 is set to the direct release position, in which pipe 20 and connected passage 19 are connected to the atmosphere.

The brake cylinder 3 is thus vented to the atmosphere by way of pipe and passage 35, passage 36, cavity 37 in the main slide valve 9, passage 19 and pipe 20, and the chambers 21 and 22 are also vented to the atmosphere through passages 38 and 39, port 44 in the main slide valve, cavity 37, passage 19 and pipe 20. It will here be noted that when the chamber 21 is vented, the pressure of the spring 33 will deflect the diaphragm 23 upwardly, causing the stem 32 to act to unseat the ball valve 30 against the pressure of the spring 31 so as to vent the chamber 22 to the chamber 21 which is connected to the atmosphere.

If it is desired to retain pressure in the brake cylinder, as when operating on a descending grade, the retaining valve handle 18 is turned to its position in which the retaining valve device 5 operates to retain a predetermined pressure in the brake cylinder. In this case, when the brake pipe pressure is initially reduced to effect an application of the brakes, the triple valve parts are actuated to service position, causing fluid under pressure from the brake pipe to be vented to the chambers 21 and 22 and an application of the brakes to be effected in the same manner as hereinbefore described. Now when the brake pipe pressure is increased and the triple valve parts are moved to release position, a predetermined degree of pressure is retained in the brake cylinder and also in the chamber 21. The pressure thus retained in the chamber 21 maintains the diaphragm 23 deflected downwardly against the opposing pressure of the spring 33 so that the ball valve 30 is maintained seated by the pressure of the spring 31 and the pressure of fluid in the valve chamber 28, so that back flow of fluid from the charged chamber 22 is not permitted.

Upon effecting a successive reduction in brake pipe pressure in cycling, the graduating slide valve 10 is initially moved relative to the main slide valve 9 to its initial quick service position as shown in Fig. 3, and then both the graduating and main slide valves are moved to their full service position as shown in Fig. 4. The graduating slide valve 10 in its initial quick service position establishes communication through which fluid under pressure is vented from the brake pipe to the chamber 21 and brake cylinder 3, and as a consequence quick service action takes place on each car in advance of the reapplication of the brakes on that car. As a consequence of the ball valve 30 being maintained seated, fluid vented from the brake pipe to the chamber 21 and brake cylinder 3 is not permitted to flow to the chamber 22 so that the extent of the reduction in brake pipe pressure, through the communication established by the graduating and main slide valves, will be reduced over that effected in effecting the initial application of the brakes in cycling, this reduction in the extent of the brake pipe reduction being due to the pressure of fluid retained in the chamber 21 and the brake cylinder 3 by the retaining valve device 5.

This prevents an excessive brake application upon a reapplication of the brakes such as would be the case if the brake pipe pressure should be reduced by venting to chambers 21 and 22, since in the reapplication of the brakes, the auxiliary reservoir must equalize into a brake cylinder volume containing fluid at the pressure retained in the brake cylinder.

The ball check valve 53 is provided for the purpose of preventing back flow of fluid under pressure from the chamber 21 when the brake pipe pressure is less than the pressure at which the brake pipe equalizes into the chamber and to prevent back flow of fluid from the chamber to the brake cylinder when the brake pipe is connected to the brake cylinder in the operation of the triple valve device from lap to service position in effecting a reapplication of the brakes.

Chambers 21 and 22 provide a relatively large volume so that if the main slide valve 9 should fail to move promptly, the brake pipe pressure will be further reduced by flow to said chambers to the point where the brake pipe pressure equalizes with the pressure in these chambers.

The purpose of the graduating spring 17 and the spring 13 have been fully described in my aforementioned pending application and in view of this further description here is deemed unnecessary since these elements are not included in the appended claims of the present application.

The subject matter relating to the quick service venting of fluid under pressure from the brake pipe is broadly covered in my aforementioned pending application and in my pending application, Serial No. 612,465, filed May 20, 1932.

While one illustrative embodiment of the invention has been described in detail, it is not my intention to limit its scope to that embodiment or otherwise than by the terms of the appended claims.

Having now described my invention, what I claim as new and desire to be secured by Letters Patent, is:

1. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a chamber connected to said retaining valve device in the release position of the triple valve device and into which fluid is vented from the brake pipe in applying the brakes, a second chamber into which fluid vented into the first mentioned chamber flows, the flow of fluid to said chambers effecting a quick service reduction in brake pipe pressure, and means operative when said retaining valve device is in pressure retaining position for preventing the flow of fluid under pressure from the second mentioned chamber to the first mentioned chamber when the triple valve device is in position to release fluid from the brake cylinder.

2. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a chamber connected to said retaining valve device in the release position of the triple valve device and into which fluid is vented from the brake pipe in applying the brakes, a second chamber into which fluid vented into the first mentioned chamber flows, the flow of fluid to said chambers effecting a quick service reduction in brake pipe pressure, and means subject to the pressure of fluid retained in the first mentioned chamber when the triple valve device is in position to release fluid under pressure from the brake cylinder for preventing back flow of fluid under pressure from the second mentioned chamber to the first mentioned chamber.

3. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a chamber connected to said retaining valve device in the release position of the triple valve device and into which fluid is vented from the brake pipe in applying the brakes, a second chamber into which fluid vented into the first mentioned chamber flows, the flow of fluid to said chambers effecting a quick service reduction in brake pipe pressure, and means operative when said pressure retaining valve device is in pressure retaining position and said triple valve device is in position to release fluid under pressure from the brake cylinder for preventing the back flow of fluid under pressure from the second mentioned chamber to the first mentioned chamber and operative when said pressure retaining valve device is in position to permit the full release of fluid under pressure from the brake cylinder for permitting fluid under pressure to flow from the second mentioned chamber to the first mentioned chamber.

4. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for contolling the exhaust of fluid under pressure from the brake cylinder and having one position for retaining fluid in the brake cylinder in releasing the brakes, and having another position for permitting the full release of fluid under pressure from the brake cylinder, a plurality of connected chambers into which fluid under pressure is both initially and finally vented in applying the brakes, and means operative to vent fluid under pressure from both of said chambers in releasing the brakes when the pressure retaining valve device is in position to permit the full release of fluid under pressure from the brake cylinder and operative when the pressure retaining valve device is in pressure retaining position to prevent back flow of fluid from one of said chambers to the other.

5. In a fluid pressure brake, the combination with a brake pipe, a brake cylinder, and a triple valve device operated upon a reduction in brake pipe pressure for supplying fluid under pressure to the brake cylinder and operated upon an increase in brake pipe pressure for releasing fluid under pressure from the brake cylinder, of a retaining valve device for controlling the exhaust of fluid under pressure from the brake cylinder and having one position for retaining fluid in the brake cylinder in releasing the brakes, and having another position for permitting the full release of fluid under pressure from the brake cylinder, a plurality of connected chambers into which fluid under pressure is both initially and finally vented in applying the brakes, and means operative to prevent back flow of fluid from one of said chambers to the other when said triple valve device is in brake releasing position and said pressure retaining valve device is in pressure retaining position.

6. In a fluid pressure brake, the combination with a brake pipe, a brake cylinder and a brake controlling valve device operated upon a reduction in brake pipe pressure for supplying fluid under pressure to the brake cylinder and operated upon an increase in brake pipe pressure for releasing fluid under pressure from the brake cylinder, of a plurality of chambers into which fluid under pressure is both initially and finally vented from the brake pipe in applying the brakes, and means operative upon the entire release of fluid under pressure in one of said chambers in releasing the brakes for venting fluid under pressure from the other of said chambers and operative to prevent the back flow of fluid from said other chamber to the first mentioned chamber when pressure is retained in the first mentioned chamber.

7. In a fluid pressure brake, the combination with a brake pipe and a triple valve device comprising valve means and a piston operated upon a reduction in brake pipe pressure for operating said valve means to effect an application of the brakes, of a chamber, and means operative upon movement of said valve means for first venting fluid under pressure from the brake pipe to said chamber at an unrestricted rate and then upon further movement of said valve means for venting fluid under pressure from the brake pipe to said chamber at a restricted rate.

8. In a fluid pressure brake, the combination with a brake pipe and a triple valve device comprising valve means and a piston operated upon a reduction in brake pipe pressure for operating said valve means to effect an application of the brakes, of a chamber, and means operative upon movement of said valve means for first venting fluid under pressure from the brake pipe to said chamber through an unrestricted communication and then upon further movement of said valve means for venting fluid under pressure from the brake pipe to said chamber through a restricted communication.

9. In a fluid pressure brake, the combination with a brake pipe and a triple valve device comprising valve means and a piston operated upon a reduction in brake pipe pressure for operating said valve means to effect an application of the brakes, of a chamber, means operative upon movement of said valve means for first venting fluid under pressure from said brake pipe to said chamber through an unrestricted communication and then upon further movement of said valve means for venting fluid under pressure from the brake pipe to said chamber through a restricted communication, and a check valve preventing back flow of fluid from said chamber.

10. In a fluid pressure brake, the combination with a brake pipe and a triple valve device comprising valve means and a piston operated upon a reduction in brake pipe pressure for operating said valve means to effect an application of the brakes, of two chambers, means operative upon movement of said valve means for first venting fluid under pressure from said brake pipe to both of said chambers through an unrestricted communication and then upon further movement of said valve means for venting fluid under pressure from the brake pipe to both of said chambers through a restricted communication, and means normally preventing back flow of fluid from one of said chambers to the other.

11. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is both initially and finally vented from the brake pipe when said valve means is operated to effect an application of the brakes, and means operative under certain conditions when said valve means is in position to effect the release of the brakes for venting fluid under pressure from one of said chambers to the other and operative under other conditions for preventing the back flow of fluid from the first mentioned chamber to said other chamber.

12. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is both initially and finally vented from the brake pipe when said valve means is operated to effect an application of the brakes, fluid under pressure being released from one of said chambers when said valve means is in position to effect the release of the brakes, and means operative upon substantially the entire release of fluid under pressure from said chamber for establishing communication through which fluid under pressure is released from the other of said chambers.

13. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is both initially and finally vented from the brake pipe when said valve means is operated to effect an application of the brakes, fluid under pressure being released from one of said chambers when said valve means are in position to effect the release of the brakes, and means operative upon substantially the entire release of fluid under pressure from said chamber for establishing communication through which fluid under pressure is released from the other of said chambers, and operative upon the retention of pressure in the first mentioned chamber for maintaining said communication closed.

14. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is both initially and finally vented from the brake pipe when said valve means is operated to effect an application of the brakes, fluid under pressure being released from one of said chambers when said valve means is in position to effect the release of the brakes, and means preventing back flow of fluid from the other of said chambers to the first mentioned chamber and operative upon a predetermined reduction in the pressure of fluid in the first mentioned chamber for establishing communication through which fluid under pressure flows from said other chamber to the first mentioned chamber.

15. In a fluid pressure brake, the combination with a brake pipe and a triple valve device comprising valve means and a piston operated upon a reduction in brake pipe pressure for operating said valve means to effect an application of the brakes and operated upon an increase in brake pipe pressure for operating said valve means to effect a release of the brakes, of two chambers into which fluid under pressure is both initially and finally vented from the brake pipe when said valve means is operated to effect an application of the brakes, fluid under pressure being released from one of said chambers when said valve means is in position to effect the release of the brakes, and means preventing back flow of fluid from the other of said chambers to the first mentioned chamber and operative in accordance with the pressure of fluid in the first mentioned chamber for establishing communication from said other chamber to the first mentioned chamber or for maintaining said communication closed.

16. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, and means operative to vent fluid under pressure from the brake pipe to the brake cylinder when said graduating valve is shifted from lap toward service position.

17. In a fluid pressure brake, the combination with a brake pipe, brake cylinder and a triple valve device comprising a main valve, a graduating valve having a movement relative to the main valve and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, and means operative to vent fluid under pressure from the brake pipe to the brake cylinder when said graduating valve is shifted from lap toward service position and to close off the flow of fluid under pressure from the brake pipe to the brake cylinder when the graduating valve is in service position.

18. In a fluid pressure brake, the combination with a brake pipe, brake cylinder and a triple valve device comprising a main valve, a graduating valve having a movement relative to the main valve and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative as said valves are moved toward service position for venting fluid under pressure from the brake pipe to said chamber, means operative in the service and lap positions of said valves for connecting the brake pipe to said chamber, and means operative to vent fluid under pressure from the brake pipe to the brake cylinder when said graduating valve is shifted from lap toward service position.

19. In a fluid pressure brake, the combination with a brake pipe, brake cylinder and a triple valve device comprising a main valve, a graduating valve having a movement relative to the main valve and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, means operative to vent fluid under pressure from the brake pipe to the brake cylinder when said graduating valve is shifted from lap toward service position, and means for preventing back flow of fluid under pressure from said chamber to said brake pipe and brake cylinder when communication is established through which fluid under pressure is vented from the brake pipe to the brake cylinder.

20. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, means operative to vent fluid under pressure from the brake pipe to the brake cylinder when said graduating valve is shifted from lap toward service position, and means preventing back flow of fluid under pressure from said chamber.

21. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, means operative to vent fluid under pressure from the brake pipe to the brake cylinder when said graduating valve is shifted from lap toward service position, and a check valve preventing back flow of fluid under pressure from said chamber.

22. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, means operative to vent fluid under pressure from the brake pipe to the brake cylinder when said graduating valve is shifted from lap toward service position, and means preventing back flow of fluid under pressure from said chamber to the brake cylinder in the service and lap positions of the triple valve device.

23. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative in the service and lap positions of said valves for connecting the brake pipe to said chamber, means operative to vent fluid under pressure from the brake pipe to the brake cylinder when said graduating valve is shifted from lap toward service position, and means preventing back flow of fluid from said chamber to the brake cylinder when communication is established between said brake pipe and brake cylinder.

24. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative as said valves are moved toward service position for venting fluid under pressure from the brake pipe to said chamber, means operative in the service and lap positions of said valves for connecting the brake pipe to said chamber, means operative to vent fluid under pressure from the brake pipe to the brake cylinder when said graduating valve is shifted from lap toward service position, and means for preventing back flow of fluid from the brake cylinder to the brake pipe when brake pipe pressure is lower than brake cylinder pressure.

25. In a fluid pressure brake, the combination with a brake pipe, brake cylinder and a triple valve device comprising a main valve, a graduating valve having a movement relative to the main valve, and a piston operated upon a reduction in brake pipe pressure for moving said valves to service position in which fluid under pressure is supplied to the brake cylinder and also having a service lap position in which the supply of fluid under pressure to the brake cylinder is cut off, of a chamber, means operative as said valves are moved toward service position for venting fluid under pressure from the brake pipe to said chamber, means operative in the service and lap positions of said valves for connecting the brake pipe to said chamber, means operative to vent fluid under pressure from the brake pipe to the brake cylinder when said graduating valve is shifted from lap toward service position, and a check valve preventing back flow of fluid from the brake cylinder to the brake pipe when brake pipe pressure is lower than brake cylinder pressure.

26. In a fluid pressure brake, the combination with a brake pipe and a triple valve device operated upon a reduction in brake pipe pressure for effecting an application of the brakes, of a chamber into which fluid is vented from the brake pipe by operation of said triple valve device upon a reduction in brake pipe pressure, a second chamber having a passageway through which fluid from the first chamber is vented into the second chamber, and means operated upon a predetermined increase in fluid pressure in the first chamber for preventing flow of fluid from the second chamber to the first chamber.

27. In a fluid pressure brake, the combination with a brake pipe, a brake cylinder and a quick service reduction chamber, of a triple valve device operable upon a reduction in brake pipe pressure to first establish communication through which fluid under pressure is vented from said brake pipe to said brake cylinder and quick service chamber and then operable to close said communication and establish communication through which fluid under pressure is supplied to the brake cylinder to effect an application of the brakes.

28. In a fluid pressure brake, the combination with a brake pipe and a brake cylinder, of a triple valve device operable upon a reduction in brake pipe pressure in initiating an application of the brakes in cycling to first vent fluid under pressure from the brake pipe to the brake cylinder for effecting a predetermined brake pipe reduction and then operable to close off the flow of fluid from the brake pipe to the brake cylinder and to establish communication through which fluid under pressure is supplied to the brake cylinder to effect an application of the brakes and being further operable in initiating succeeding applications of the brakes for venting fluid under pressure from the brake pipe to the brake cylinder according to the pressure of fluid retained in the brake cylinder.

29. In a fluid pressure brake, the combination with a brake pipe, a brake cylinder and a quick service bulb, of a triple valve device initially operable in effecting an initial application of the brakes in cycling for venting fluid under pressure from said brake pipe to the brake cylinder and quick service bulb for effecting a predetermined reduction in brake pipe pressure and operable to vent fluid under pressure from the brake cylinder to effect the release of the brakes, and means for retaining a predetermined pressure in the brake cylinder and bulb in releasing the brakes, said triple valve device being operable in effecting a succeeding application of the brakes in cycling for initially venting fluid under pressure from said brake pipe to the brake cylinder and bulb according to the pressure of fluid retained in the brake cylinder and bulb.

30. In a fluid pressure brake, the combination with a brake pipe and a brake cylinder, of a triple valve device operative to effect an application of the brakes and for locally venting fluid under pressure from the brake pipe to the brake cylinder in advance of the movement of the triple valve device to a brake applying position and operable in cycling the brakes for effecting a local reduction in brake pipe pressure according to the pressure of fluid in the brake cylinder in advance of the reapplication of the brakes.

31. In a fluid pressure brake, the combination with a brake pipe and a triple valve device comprising valve means and a piston operated upon a reduction in brake pipe pressure for operating said valve means to effect an application of the brakes, of a chamber, and means operative upon movement of said valve means in effecting an application of the brakes for first venting fluid under pressure from the brake pipe to said chamber at a certain rate and then upon further movement of said valve means for venting fluid under pressure from the brake pipe to said chamber at a slower rate.

32. In a fluid pressure brake, the combination with a brake pipe and a triple valve device comprising valve means and a piston operated upon a reduction in brake pipe pressure for operating said valve means to effect an application of the brakes, of a chamber normally open to the atmosphere, said valve means being operative upon initial movement toward application position for first venting fluid under pressure from the brake pipe to said chamber at a certain rate and operative upon further movement toward application position for closing the communication from said chamber to the atmosphere and for venting fluid under pressure from the brake pipe to said chamber at a slower rate.

33. In a fluid pressure brake equipment, the combination with a brake pipe, and a chamber, of a triple valve device comprising a main valve having a passage in communication with the brake pipe and a passage in communication with said chamber, a graduating valve having a cavity and movable a limited distance relative to the main valve and a piston operated upon a reduction in brake pipe pressure for moving said valves to effect an application of the brakes, the cavity in the graduating valve connecting the passages in the main valve when the graduating valve is moved relative to the main valve toward application position, and means in the main slide valve and separate from said passages for connecting the brake pipe to said chamber when said valves are moved to application position.

34. In a fluid pressure brake, the combination with a brake pipe, of a triple valve device comprising a main valve having a port in communication with the brake pipe and having a port in communication with a passage through which fluid is adapted to be vented from the brake pipe, a graduating valve movable a limited distance relative to said main valve and a piston operated upon a reduction in brake pipe pressure for moving said valves to effect an application of the brakes, said graduating valve having a cavity for connecting the ports in the main valve when the graduating valve is moved relative to the main valve toward application position, and means in the main valve for connecting the brake pipe to said passage when the main valve is moved toward application position.

35. In a fluid pressure brake, the combination with a brake pipe, of a triple valve device comprising a main valve having a port in communication with the brake pipe and having a port in communication with a passage through which fluid is adapted to be vented from the brake pipe, a graduating valve movable a limited distance relative to said main valve and a piston operated upon a reduction in brake pipe pressure for moving said valves to effect an application of the brakes, said graduating valve having a cavity for connecting the ports in the main valve when the graduating valve is moved relative to the main valve toward application position, and said main valve having a cavity for connecting the brake pipe to said passage when the main valve is moved toward application position, and means in said cavity for retarding the rate of flow of fluid from the brake pipe to said passage.

36. In a fluid pressure brake, the combination with a brake pipe, of a triple valve device comprising a main valve and an auxiliary valve having a movement relative to the main valve and a piston operated upon a reduction in brake pipe pressure for moving said valves to effect an application of the brakes, a passage to which fluid under pressure is adapted to be vented from the brake pipe, means included in said valves and cooperating upon the initial movement of the auxiliary valve relative to the main valve toward application position to establish a communication through which fluid under pressure is vented from the brake pipe to said passage, and means included in said main valve for establishing a communication through which fluid under pressure is vented from the brake pipe to said passage when the main valve is moved toward application position.

37. In a fluid pressure brake, the combination with a brake pipe, of a triple valve device comprising a main valve and an auxiliary valve having a movement relative to the main valve and a piston operated upon a reduction in brake pipe pressure for moving said valves to effect an application of the brakes, a passage to which fluid under pressure is adapted to be vented from the brake pipe, means included in said valves and cooperating upon the initial movement of the auxiliary valve relative to the main valve toward application position to establish a communication through which fluid under pressure is vented from the brake pipe to said passage, means included in said main valve for establishing a communication through which fluid under pressure is vented from the brake pipe to said passage when the main valve is moved toward application position, and means for retarding the rate of flow of fluid through the last mentioned communication.

38. In a fluid pressure brake, the combination with a brake pipe, of a triple valve device comprising a main valve and an auxiliary valve having a movement relative to the main valve and a piston operated upon a reduction in brake pipe pressure for moving said valves to effect an application of the brakes, a passage to which fluid under pressure is adapted to be vented from the brake pipe, means included in said valves and cooperating upon the initial movement of the auxiliary valve relative to the main valve toward application position to establish a communication through which fluid under pressure is vented from the brake pipe to said passage, means included in said main valve for establishing a communication through which fluid under pressure is vented from the brake pipe to said passage when the main valve is moved toward application position, and a restriction in the last mentioned communication for retarding the rate of flow of fluid from the brake pipe.

39. In a fluid pressure brake, the combination with a brake pipe, of a triple valve device comprising a main valve and an auxiliary valve having a movement relative to the main valve and a piston operated upon a reduction in brake pipe pressure for moving said valves to effect an application of the brakes, a passage to which fluid under pressure is adapted to be vented from the brake pipe, means included in said valves and cooperating upon the initial movement of the auxiliary valve relative to the main valve toward application position to establish a communication through which fluid under pressure is vented from the brake pipe to said passage, means included in said main valve for establishing a communication through which fluid under pressure is vented from the brake pipe to said passage when the main valve is moved toward application position, and means included in said main valve for retarding the rate of flow of fluid through the last mentioned communication.

40. In a fluid pressure brake, the combination with a brake pipe and a triple valve device comprising a main valve, a graduating valve having a movement relative to the main valve and a piston operated upon a reduction in brake pipe pressure for actuating said valves, means operative upon movement of the graduating valve relative to said main valve for venting fluid under pressure from the brake pipe at a certain rate, means operative upon movement of the main valve by said piston for also venting fluid under pressure from the brake pipe, and means included in said main valve for retarding the rate of flow of fluid from the brake pipe when the second mentioned means is effective to vent fluid from the brake pipe.

41. In a fluid pressure brake, the combination with a brake pipe, of a valve device comprising valve means and a piston operated upon a reduction in brake pipe pressure in effecting an application of the brake for first venting fluid under pressure from the brake pipe at a certain rate and then upon further movement of the valve means for venting fluid under pressure from the brake pipe at a different rate, said valve means comprising a main valve having a choked port for controlling the rate of flow of fluid from the brake pipe upon said further movement of the valve means.

42. In a fluid pressure brake, the combination with a brake pipe and two quick service chambers, of a triple valve device movable upon a reduction in brake pipe pressure to an application position for effecting an application of the brakes and for venting fluid under pressure from said brake pipe to said quick service chambers for effecting a quick service reduction in brake pipe pressure, and movable upon an increase in brake pipe pressure to a release position for effecting a release of brakes and for establishing a communication through which fluid under pressure is vented from one of said chambers, a communication for venting fluid under pressure from the other of said quick service chambers, and valve means operative when the pressure in the first mentioned communication exceeds a predetermined degree for closing the second mentioned communication and operative when the pressure in the first mentioned communication is lower than said predetermined degree to permit opening of the second mentioned communication.

43. In a fluid pressure brake, the combination with a brake pipe and two quick service chambers, of a triple valve device movable upon a reduction in brake pipe pressure to an application position for effecting an application of the brakes and for venting fluid under pressure from said brake pipe to said quick service chambers for effecting a quick service reduction in brake pipe pressure, and movable upon an increase in brake pipe pressure to a release position for effecting a release of the brakes and for establishing a release communication through which fluid under pressure is vented from one of said chambers, a valve for controlling a vent communication to the other of said chambers, and a movable abutment, subject to the opposing pressures of said release communication and atmosphere, when said triple valve device is in release position for operating said valve to maintain said vent communication closed until the pressure of fluid in said release communication is reduced to below a chosen degree.

44. In a fluid pressure brake, the combination with a brake pipe, a brake cylinder and two quick service chambers, of a triple valve device movable upon a reduction in brake pipe pressure to an application position for supplying fluid under pressure to said brake cylinder and for venting fluid under pressure from said brake pipe to said quick service chambers, and movable upon an increase in brake pipe pressure to a release position for releasing fluid under pressure from said brake cylinder and for establishing a communication from one of said quick service chambers to that through which fluid under pressure is released from said brake cylinder for releasing fluid under pressure from the last mentioned quick service chamber, and valve means for controlling a vent communication to the other quick service chamber, said valve means being operated by the pressure of fluid in the first mentioned communication to maintain the vent communication closed until the pressure in the first mentioned communication is reduced to below a chosen degree.

45. In a fluid pressure brake, the combination with a brake pipe, a brake cylinder and two quick service chambers, of a triple valve device movable upon a reduction in brake pipe pressure to an application position for supplying fluid under pressure to said brake cylinder and for venting fluid under pressure from said brake pipe to said quick service chambers, and movable upon an increase in brake pipe pressure to a release position for releasing fluid under pressure from said brake cylinder and for establishing a communication from one of said quick service chambers to that through which fluid under pressure is released from said brake cylinder for releasing fluid under pressure from the last mentioned quick service chamber, a pressure retaining valve device for controlling the venting of fluid under pressure from said brake cylinder and the last mentioned quick service chamber and having a position for retaining a chosen pressure therein, and valve means for controlling a vent communication to the other quick service chamber and operated by fluid at the pressure retained in said brake cylinder for maintaining said vent communication closed.

46. In a fluid pressure brake, the combination with a brake pipe, a brake cylinder, and a brake controlling valve device operative upon a reduction in brake pipe pressure to cause fluid under pressure to be supplied to the brake cylinder to effect an application of the brakes, of a chamber, means controlled by said brake controlling valve device for locally venting fluid under pressure from said brake pipe into said chamber upon a reduction in brake pipe pressure, check valve means operable to prevent back flow of fluid under pressure from the chamber, and means operated upon a predetermined increase in chamber pressure for operating said check valve to prevent back flow of fluid under pressure from the chamber while permitting flow of fluid under pressure from the brake pipe into the said chamber and operable upon a reduction in brake cylinder pressure to a degree less than a predetermined value for rendering said check valve ineffective to prevent back flow of fluid under pressure from the chamber.

CLYDE C. FARMER.